United States Patent [19]
Obara

[11] Patent Number: 6,102,575
[45] Date of Patent: Aug. 15, 2000

[54] COMPOUND BEARING APPARATUS

[75] Inventor: Rikuro Obara, Nagano-ken, Japan

[73] Assignee: Minebea Co., Ltd., Nagano-ken, Japan

[21] Appl. No.: 09/233,186

[22] Filed: Jan. 20, 1999

[30] Foreign Application Priority Data

Jan. 20, 1998 [JP] Japan ................................ 10-23739

[51] Int. Cl.$^7$ ................................................ F16C 33/80
[52] U.S. Cl. ........................................ 384/480; 384/488
[58] Field of Search .................................. 384/477, 480, 384/488, 504, 505, 506

[56] References Cited

U.S. PATENT DOCUMENTS

| | | | |
|---|---|---|---|
| 2,044,380 | 6/1936 | Cobb | 384/488 |
| 4,810,108 | 3/1989 | Yajima | 384/488 |
| 4,827,168 | 5/1989 | Nakajima | 384/488 X |
| 5,556,209 | 9/1996 | Obara et al. | 384/504 |
| 5,560,715 | 10/1996 | Mosby | 384/477 |
| 5,841,210 | 11/1998 | Obara | 384/504 X |

*Primary Examiner*—Thomas R. Hannon
*Attorney, Agent, or Firm*—Lowe Hauptman Gopstein Gilman & Berner

[57] ABSTRACT

A compound bearing apparatus of the present invention comprising a shaft, a sleeve outer ring surrounding the shaft, two rows of rotating bodies disposed between the shaft and the sleeve including a first row of the rotating bodies interposed between an outer rolling contact recess formed directly on the outer periphery of the shaft and a first inner rolling contact recess formed on the inner peripheral surface of the sleeve outer ring, and a second row of the rotating bodies interposed between an outer rolling contact recess formed on the outer periphery of an inner ring fitted onto the shaft and a second inner rolling contact recess formed on the inner peripheral surface of the sleeve, and a pair of inner and outer sealing plates having a through hole at the central portion thereof; wherein at the one side of the apparatus where the first row of the rotating bodies is provided, the sealing plates are mounted between the sleeve outer ring and the shaft with leaving between the plates and the sleeve outer ring or the shaft a slight clearance sufficient to provide a labyrinth seal function, and at the other side of the apparatus where the second row of the rotating bodies is provided, the sealing plates are mounted between the sleeve outer ring and the inner ring with leaving between the plates and the sleeve outer ring or the inner ring a slight clearance sufficient to provide a labyrinth seal function.

18 Claims, 8 Drawing Sheets

COMPOUND BEARING APPARATUS

BACKGROUND OF THE INVENTION

TECHNICAL FIELD

The present invention relates to a compound bearing apparatus including two rows of rotating bodies, in particular to a compound bearing apparatus including on both ends thereof a pair of sealing plates of non-contacting type especially suitable for the spindle motor to be used in the hard disk drive means.

DESCRIPTION OF THE PRIOR ART

In the art, some bearing apparatus includes an annular sealing plate or plates mounted between the inner and outer rings or between the shaft and the outer ring so as to prevent the lubricant from splashing out of the apparatus or to prevent dust or dirt from entering into the apparatus. In the prior art, the sealing plates of non-contacting type may be employed in these bearing apparatus.

In the case of bearing apparatus including inner and outer rings, the sealing structure of non-contacting type including a sealing plate is secured at its outer peripheral portion by means of adhesive to the end face of the outer ring with leaving a slight clearance between the inner peripheral portion thereof and the inner ring to avoid the contacting of the sealing plate with the inner ring.

Upon rotating the inner or outer ring, there is still a problem of flowing the lubricant enclosed within the apparatus out through the clearance defined at the non-contacting portion. In particular, in the case of the bearing apparatus employed in the spindle motor of the hard disk drive means, the lubricant will be splashed and dispersed out through the slight clearance defined between the sealing plate and the inner ring during the rotation of the motor in high speed. Thus produced finely dispersed lubricant or oil mist is apt to get into the disk enclosure of the hard disk drive means and adhered to the magnetic disk or magnetic head to cause the crushing accident of the disk and the head.

One of the countermeasures having been taken for preventing the above-mentioned accident is to contact the inner peripheral portion of the sealing plate with the inner ring. The outer peripheral portion thereof is secured to the outer ring. However, such structure can not be adopted under the following reasons;

the heat or the torque due to friction can be produced;

the leakage of the lubricant will be caused by the wear of the sealing plate; and wear particles can be produced.

Presently, under the reasons mentioned above, there is also the bearing apparatus including the sealing structure of the non-contacting type at the equipment side and an additional labyrinth seal mechanism or a magnetic fluid seal mechanism at the opposite side. In the case that the additional labyrinth seal mechanism is included, there is a tendency to increase the manufacturing cost because of its complicated structure. In the case that the magnetic fluid seal mechanism is included, there is a tendency to spread the magnetic fluid out under the effect of centrifugal force, and sometimes the magnetic fluid will be dispersed under the effect of local difference of pressure. In conclusion, both mechanism mentioned-above are also not suitable for utilizing in the spindle motor for the hard disk drive means.

Accordingly, the object of the present invention is to provide a compound bearing apparatus suitable for the spindle motor of the hard disk drive means. In such a compound bearing apparatus, the labyrinth seal mechanism or mechanisms which was provided in the prior art additionally is incorporated thereinto so as to increase the sealing function of the sealing structure of the non-contacting type to the level in which sufficient effect can be obtained.

SUMMARY OF THE INVENTION

This object is achieved by a compound bearing apparatus comprising a shaft, a sleeve outer ring surrounding the shaft, two rows of rotating bodies disposed between the shaft and the sleeve including a first row of the rotating bodies interposed between an outer rolling contact recess formed directly on the outer periphery of the shaft and a first inner rolling contact recess formed on the inner peripheral surface of the sleeve outer ring and a second row of the rotating bodies interposed between an outer rolling contact recess formed on the outer periphery of an inner ring fitted onto the shaft and a second inner rolling contact recess formed on the inner peripheral surface of the sleeve, and a pair of inner and outer sealing plates having a through hole at the central portion thereof; wherein at the one side of the apparatus where the first row of the rotating bodies is provided, the sealing plates are mounted between the sleeve outer ring and the shaft with leaving between the plates and the sleeve outer ring or the shaft a slight clearance sufficient to provide a labyrinth seal function, and at the other side of the apparatus where the second row of the rotating bodies is provided, the sealing plates are mounted between the sleeve outer ring and the inner ring with leaving between the plates and the sleeve outer ring or the inner ring a slight clearance sufficient to provide a labyrinth seal function.

Alternatively, a compound bearing apparatus comprising a two-stepped shaft including an enlarged diameter shaft portion and a reduced diameter shaft portion, a sleeve outer ring surrounding the stepped shaft, two rows of rotating bodies disposed between the shaft and the sleeve including a first row of the rotating bodies interposed between an outer rolling contact recess formed directly on the outer periphery of the enlarged diameter shaft portion of the two-stepped shaft and a first inner rolling contact recess formed on the inner peripheral surface of the sleeve outer ring and a second row of the rotating bodies interposed between an outer rolling contact recess formed on the outer periphery of an inner ring fitted onto the reduced diameter shaft portion of the two-stepped shaft and a second inner rolling contact recess formed on the inner peripheral surface of the sleeve, and a pair of inner and outer sealing plates having a through hole at the central portion thereof; wherein at the one side of the apparatus where the first row of the rotating bodies is provided, the sealing plates are mounted between the sleeve outer ring and the enlarged diameter shaft portion with leaving between the plates and the sleeve outer ring or the enlarged diameter shaft portion a slight clearance sufficient to provide a labyrinth seal function, and at the other side of the apparatus where the second row of the rotating bodies is provided, the sealing plates are mounted between the sleeve outer ring and the inner ring with leaving between the plates and the sleeve outer ring or the inner ring a slight clearance sufficient to provide a labyrinth seal function.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

The First Embodiment of the Invention

Figure 1:
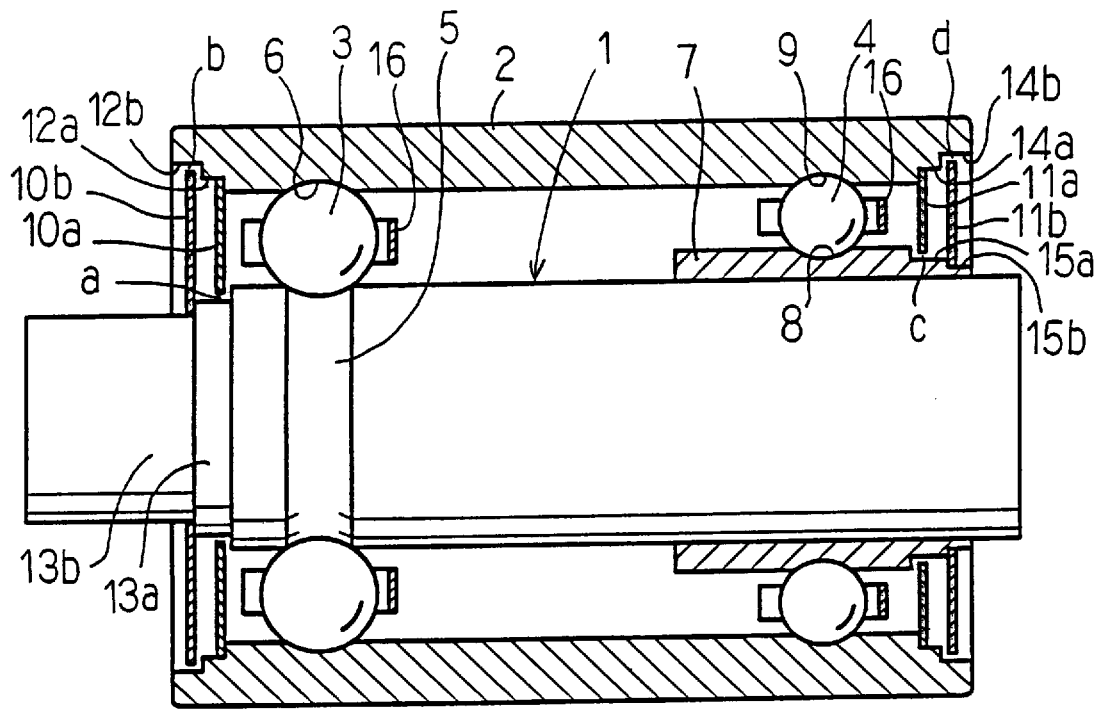
FIG. 1 is an longitudinal sectional view of the compound bearing apparatus in accordance with the first embodiment of the present invention.

The first embodiment of the compound ball bearing apparatus of the present invention will now be described with reference to FIG. 1, wherein two rows of balls 3, 4 are disposed between a shaft 1 and a sleeve outer race 2 surrounding the shaft. The balls 3 of the first row are interposed between an outer rolling contact recess 5 cut directly into the outer peripheral surface of the shaft 1 and a first inner rolling contact recess 6 formed on the interior surface of the sleeve 2. The balls 4 of the second row are interposed between an outer rolling contact recess 8 cut into the outer peripheral surface of an inner ring 7 fitted onto the shaft 1 and a second inner rolling contact recess 9 formed on the interior surface of the sleeve 2.

At the one end of the sleeve 2 where the first row of balls 3 (the left side of FIG. 1) are provided, the clearance formed between the shaft 1 and sleeve 2 is adapted to be closed by a pair of annular sealing plates 10a, 10b. Similarly, at the other end of the sleeve 2 where the second row of balls 4 (the right side of FIG. 1) are provided, the clearance formed between the sleeve 2 and the inner ring 7 is adapted to be closed by a pair of annular sealing plates 11a, 11b.

In the side of the apparatus in which the first row of balls 3 is provided, the sleeve 2 has a pair of stepped recess 12a and 12b, and the shaft 1 has a pair of inner and outer reduced diameter portions 13a and 13b formed in the stepped manner. The inner sealing plate 10a is secured at its outer peripheral portion by means of adhesive to the end face of the inner recess 12a of the sleeve 2 with leaving a slight clearance (a) between the inner peripheral portion thereof and the outer peripheral surface of the inner reduced diameter portion 13a of the shaft 1 to avoid contacting of the sealing plate with the shaft 1. Thus, a labyrinth seal function can be obtained.

The outer sealing plate 10b is secured at its inner peripheral portion by means of adhesive to the outer reduced diameter portion 13b of the shaft 1 with leaving a slight clearance (b) between the outer peripheral portion thereof and the outer recess 12b of the sleeve 2 to avoid contacting of the sealing plate with the sleeve. Thus, a labyrinth seal function can be obtained.

In the side of the apparatus in which the second row of balls 4 is provided, the sleeve 2 has a pair of stepped recess 14a and 14b, and the inner ring 7 provided on the shaft 1 has a pair of inner and outer reduced diameter portions 15a and 15b formed in the stepped manner. The inner sealing plate 11a is secured at its outer peripheral portion by means of adhesive to the end face of the inner recess 14a of the sleeve 2 with leaving a slight clearance (c) between the inner peripheral portion thereof and the inner reduced diameter portion 15a of the inner ring 7 to avoid contacting of the sealing plate with the inner ring 7. Thus, a labyrinth seal function can be obtained.

The outer sealing plate 11b is secured at its inner peripheral portion by means of adhesive to the outer reduced diameter portion 15b of the inner ring 7 with leaving a slight clearance (d) between the outer peripheral portion thereof and the outer recess 14b of the sleeve 2 to avoid contacting of the sealing plate with the inner ring. Thus, a labyrinth seal function can be obtained.

The reference numeral 16 is added to a ball retainer.

Upon assembling the above mentioned compound bearing apparatus, balls 3 of the first row are disposed between the outer rolling contact recess 5 of the shaft 1 and the inner rolling contact recess 6 of the sleeve outer race 2, the inner ring 7 is slidably fitted on the shaft 1, balls 4 of the second row are disposed between the outer rolling contact recess 8 of the inner ring 7 and the second inner rolling contact recess 9 of the sleeve outer race 2, and then the inner ring 7 is secured to the shaft 1 by means of adhesive with applying an appropriate stress to the outer end face of the inner ring 7. The securing operation of the sealing plates are effected after completed the above mentioned assembling operation.

Although adhesive is used to secure the sealing plates in the above mentioned first embodiment of the invention, so called press fit operation can be employed to secure the sealing plates as mentioned below. In such an instance, the inner sealing plate 10a is adapted to be press fitted into the inner recess 12a of sleeve 2, the outer sealing plate 10b is adapted to be press fitted onto the outer reduced diameter portion 13a of the shaft 1, the inner sealing plate 11a is adapted to be press fitted into the inner recess 14a of sleeve 2, and the outer sealing plate 11b is adapted to be press fitted onto the outer reduced diameter portion 15b of the inner ring 7.

The Second Embodiment of the Invention

Figure 2:
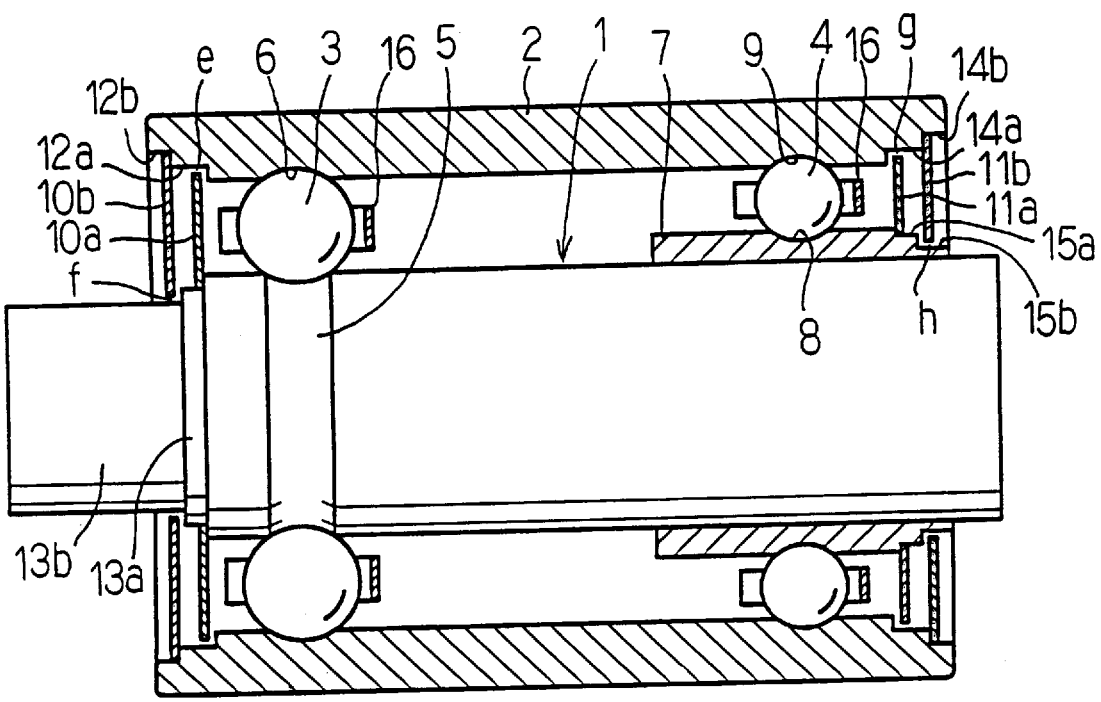
FIG. 2 is an longitudinal sectional view of the compound bearing apparatus in accordance with the second embodiment of the present invention.

The second embodiment of the compound ball bearing apparatus of the present invention will now be described with reference to FIG. 2. In the side of the apparatus in which the first row of balls 3 is provided (the left side of FIG. 2), the inner sealing plate 10a is secured at its inner peripheral portion by means of adhesive to the outer peripheral surface of the reduced diameter portion 13a of shaft 1 with leaving a slight clearance (e) between the outer peripheral portion thereof and the inner recess 12a of the sleeve outer race 2 to avoid contacting of the sealing plate with the sleeve. Thus, a labyrinth seal function can be obtained.

The outer sealing plate 10b is secured at its outer peripheral portion by means of adhesive to the outer recess 12b of the sleeve 2 with leaving a slight clearance (f) between the inner peripheral portion thereof and the outer reduced diameter portion 13b of the shaft 1 to avoid contacting of the sealing plate with the shaft 1. Thus, a labyrinth seal function can be obtained.

In the side of the apparatus in which the second row of balls 4 is provided (the right side of FIG. 2), the inner sealing plate 11a is secured at its inner peripheral portion by means of adhesive to the inner reduced diameter portion 15a of the inner ring 7 with leaving a slight clearance (g) between the outer peripheral portion thereof and the inner recess 14a of the sleeve 2 to avoid contacting of the sealing plate with the sleeve. Thus, a labyrinth seal function can be obtained.

The outer sealing plate 11b is secured at its outer peripheral portion by means of adhesive to the end face of the outer recess 14b with leaving a slight clearance (h) between the inner peripheral portion thereof and the outer reduced diameter portion 15b to avoid contacting of the sealing plate with the inner ring 7. Thus, a labyrinth seal function can be obtained.

In the above mentioned second embodiment of the invention, adhesive is also used to secure the sealing plates. However, so called press fit operation can be employed to secure the sealing plates as mentioned below. In such an instance, the inner sealing plate 10a is adapted to be press fitted onto the outer reduced diameter portion 13a of the shaft 1, the outer sealing plate 10b is adapted to be press fitted into the outer recess 12b, the inner sealing plate 11a is adapted to be press fitted onto the inner reduced diameter portion 15a of the inner ring 7, and the outer sealing plate 11b is adapted to be press fitted into the inner recess 14a of the sleeve 2.

The Third Embodiment of the Invention

Figure 3:
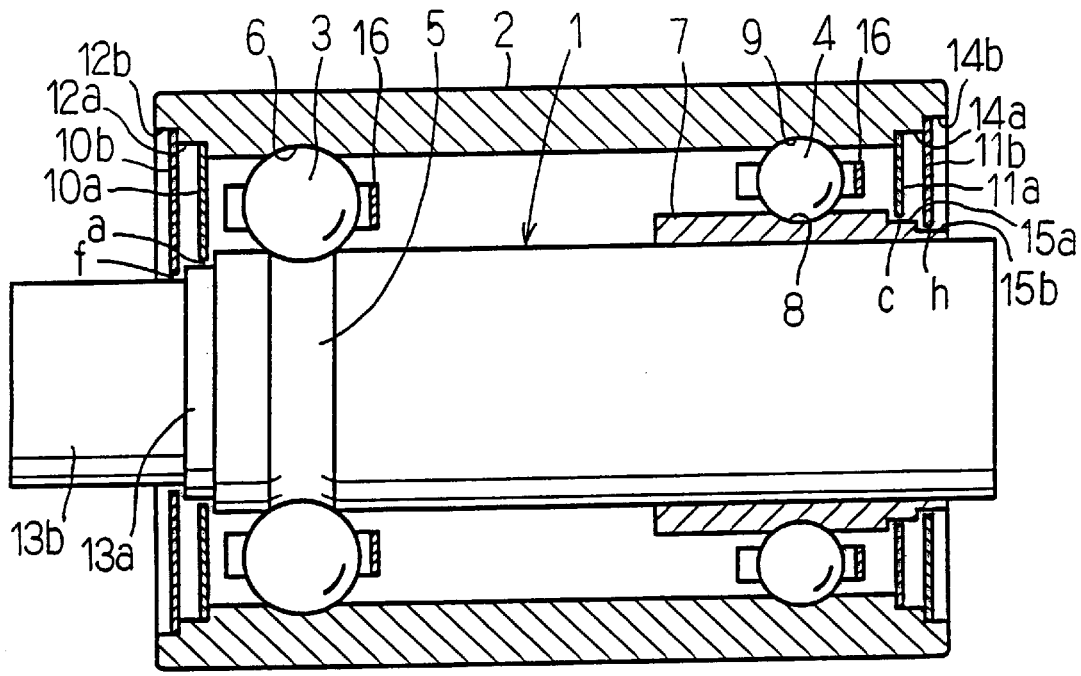
FIG. 3 is an longitudinal sectional view of the compound bearing apparatus in accordance with the third embodiment of the present invention.

The third embodiment of the compound ball bearing apparatus of the present invention will now be described with reference to FIG. 3. In the side of the apparatus in which the first row of balls 3 is provided (the left side of FIG. 3), the inner sealing plate 10a is secured at its outer peripheral portion by means of adhesive to the end face of the inner recess 12a of the sleeve 2 with leaving a slight clearance (a) between the inner peripheral portion thereof and the inner reduced diameter portion 13a of the shaft 1 to avoid contacting of the sealing plate with the shaft 1. Thus, a labyrinth seal function can be obtained.

The outer sealing plate 10b is secured at its outer peripheral portion by means of adhesive to the outer recess 12b of the sleeve 2 with leaving a slight clearance (f) between the inner peripheral portion thereof and the outer reduced diameter portion 13b of the shaft 1 to avoid contacting of the sealing plate with the shaft 1. Thus, a labyrinth seal function can be obtained.

In the side of the apparatus in which the second row of balls 4 is provided (the right side of FIG. 3), the inner sealing plate 11a is secured at its outer peripheral portion by means of adhesive to the end face of the inner recess 14a of the sleeve 2 with leaving a slight clearance (c) between the inner peripheral portion thereof and the outer peripheral surface of the inner reduced diameter portion 15a of the inner ring 7 to avoid contacting of the sealing plate with the inner ring 7. Thus, a labyrinth seal function can be obtained.

The outer sealing plate 11b is secured at its outer peripheral portion by means of adhesive to the end face of the outer recess 14b of the sleeve 2 with leaving a slight clearance (h) between the inner peripheral portion thereof and the outer reduced diameter portion 15b of the inner ring 7 to avoid contacting of the sealing plate with the inner ring 7. Thus, a labyrinth seal function can be obtained.

In the above mentioned third embodiment of the invention, adhesive is also used to secure the sealing plates. However, so called press fit operation can be employed to secure the sealing plates as mentioned below. In such an instance, each of the inner and outer sealing plates 10a and 10b are adapted to be press fitted into the inner and outer recesses 12a and 12b respectively, and each of the inner and outer sealing plates 11a and 11b are also adapted to be press fitted into the inner and outer recesses 14a and 14b of the sleeve 2 respectively.

The Fourth Embodiment of the Invention

Figure 4:
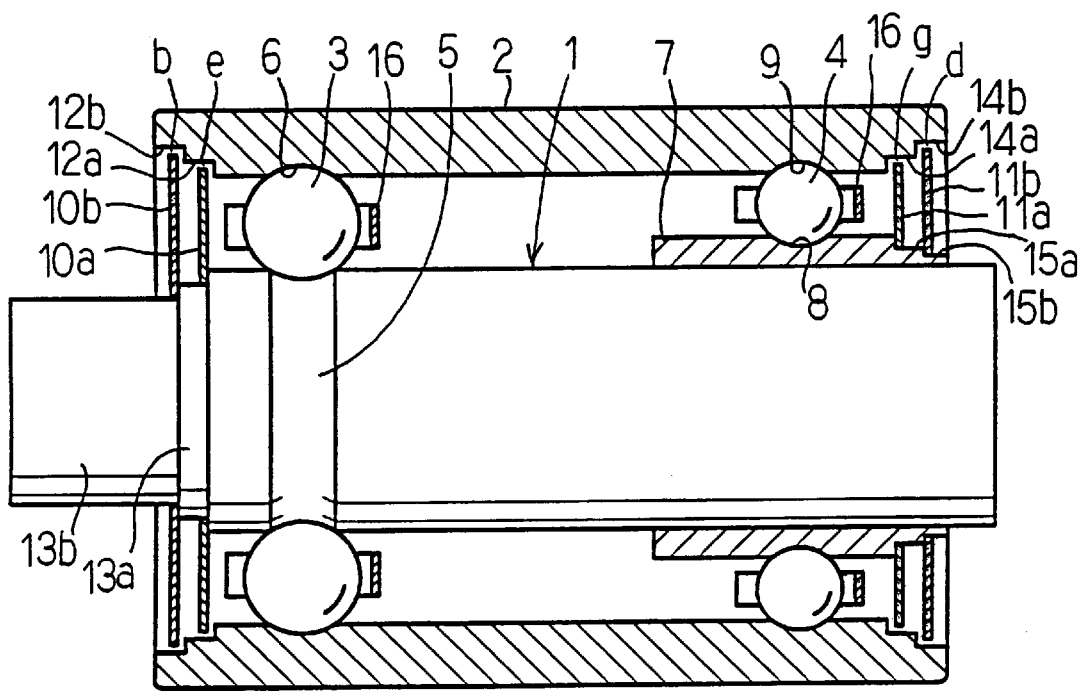
FIG. 4 is an longitudinal sectional view of the compound bearing apparatus in accordance with the fourth embodiment of the present invention.

The fourth embodiment of the compound ball bearing apparatus of the present invention will now be described with reference to FIG. 4. In the side of the apparatus in which the first row of balls 3 is provided (the left side of FIG. 4), the inner sealing plate 10a is secured at its inner peripheral portion by means of adhesive to the outer peripheral surface of the inner reduced diameter portion 13a of the shaft 1 with leaving a slight clearance (e) between the outer peripheral portion thereof and the inner recess 12a of the sleeve outer race 2 to avoid contacting of the sealing plate with the sleeve 2. Thus, a labyrinth seal function can be obtained.

The outer sealing plate 10b is secured at its inner peripheral portion by means of adhesive to the outer reduced diameter portion 13b of the shaft 1 with leaving a slight clearance (b) between the outer peripheral portion thereof and the outer recess 12b of the sleeve 2 to avoid contacting of the sealing plate with the sleeve. Thus, a labyrinth seal function can be obtained.

In the side of the apparatus in which the second row of balls 4 is provided (the right side of FIG. 4), the inner sealing plate 11a is secured at its inner peripheral portion by means of adhesive to the outer peripheral surface of the inner reduced diameter portion 15a of the inner ring 7 with leaving a slight clearance (g) between the outer peripheral portion thereof and the inner recess 14a of the sleeve 2 to avoid contacting of the sealing plate with the sleeve 2. Thus, a labyrinth seal function can be obtained.

The outer sealing plate 11b is secured at its inner peripheral portion by means of adhesive to the outer peripheral surface of the outer reduced diameter portion 15b of the inner ring 7 with leaving a slight clearance (d) between the outer peripheral portion thereof and the outer recess 14b of the sleeve 2 to avoid contacting of the sealing plate with the sleeve outer race. Thus, a labyrinth seal function can be obtained.

In the above mentioned fourth embodiment of the invention, adhesive is also used to secure the sealing plates. However, so called press fit operation can be employed to secure the sealing plates as mentioned below. In such an instance, each of the inner and outer sealing plates 10a and 10b are adapted to be press fitted onto the inner and outer reduced diameter portion 13a and 13b respectively, and each of the inner and outer sealing plates 11a 11b are adapted to be press fitted onto the inner and outer reduced diameter portion 15a and 15b of the inner ring 7 respectively.

The Fifth Embodiment of the Invention

The fifth embodiment of the compound ball bearing apparatus of the present invention will now be described with reference to FIG. 5. In the side of the apparatus in which the first row of balls 3 is provided (the left side of FIG. 5), the inner sealing plate 10a is secured at its inner peripheral portion by means of adhesive to the outer peripheral surface of the reduced diameter portion 13a of the shaft 1 with leaving a slight clearance (e) between the outer peripheral portion thereof and the inner recess 12a of the sleeve outer race 2 to avoid contacting of the sealing plate with the sleeve 2. Thus, a labyrinth seal function can be obtained.

The outer sealing plate 10b is secured at its outer peripheral portion by means of adhesive to the outer recess 12b of the sleeve 2 with leaving a slight clearance (f) between the inner peripheral portion thereof and the outer reduced diameter portion 13b of the shaft 1 to avoid contacting of the sealing plate with the shaft 1. Thus, a labyrinth seal function can be obtained.

Figure 5:
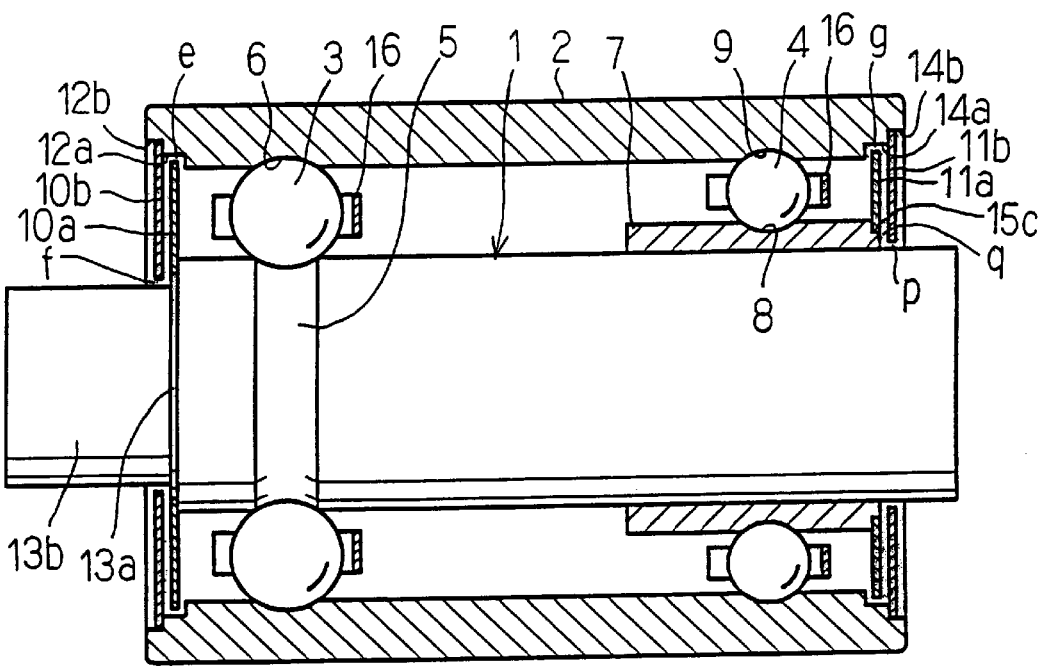
FIG. 5 is an longitudinal sectional view of the compound bearing apparatus in accordance with the fifth embodiment of the present invention.

In the side of the apparatus in which the second row of balls 4 is provided (the right side of FIG. 5), the apparatus in accordance with the embodiment as shown in FIG. 5 is different in the structure of the inner ring 7 and the outer sealing plate 11b from those of the above-mentioned embodiments.

In other words, only one reduced diameter portion 15c is provided on the inner ring 7, and the inner sealing plate 11a is secured at its inner peripheral portion by means of adhesive to the end face of the reduced diameter portion 15c with leaving a slight clearance (g) between the outer peripheral portion thereof and the inner recess 14a of the sleeve outer race 2 to avoid contacting of the sealing plate with the sleeve 2. Thus, a labyrinth seal function can be obtained.

The diameter of the inner peripheral portion of the outer sealing plate 11b is dimensioned so as to be slightly larger than that of the bore provided through the inner ring 7 for accommodating the shaft 1, i.e. the outer diameter of the shaft 1. The outer sealing plate 11b is secured at its outer peripheral portion by means of adhesive to the end face of the outer recess 14b of the sleeve 2 with leaving a slight clearance (p) between the inner peripheral portion thereof and the outer peripheral surface of the shaft 1 and with leaving a slight axial clearance (q) between the interior surface thereof and the outer end face of the inner ring 7 to avoid contacting of the sealing plate with the inner ring 7 and the shaft 1. Thus, a labyrinth seal function can be obtained.

In the above mentioned fifth embodiment of the invention, adhesive is also used to secure the sealing plates. However, so called press fit operation can be employed to secure the sealing plates as mentioned below. In such an instance, the inner sealing plate 10a is adapted to be press fitted onto the inner reduced diameter portion 13a of the shaft 1, the outer sealing plate 10b is adapted to be press fitted into the outer recess 12b of the sleeve 2, the inner sealing plate 11a is adapted to be press fitted onto the reduced diameter portion 15c of the inner ring 7, and the outer sealing plate 11b is adapted to be press fitted into the outer recess 14b of the sleeve 2.

The Sixth Embodiment of the Invention

Figure 6:
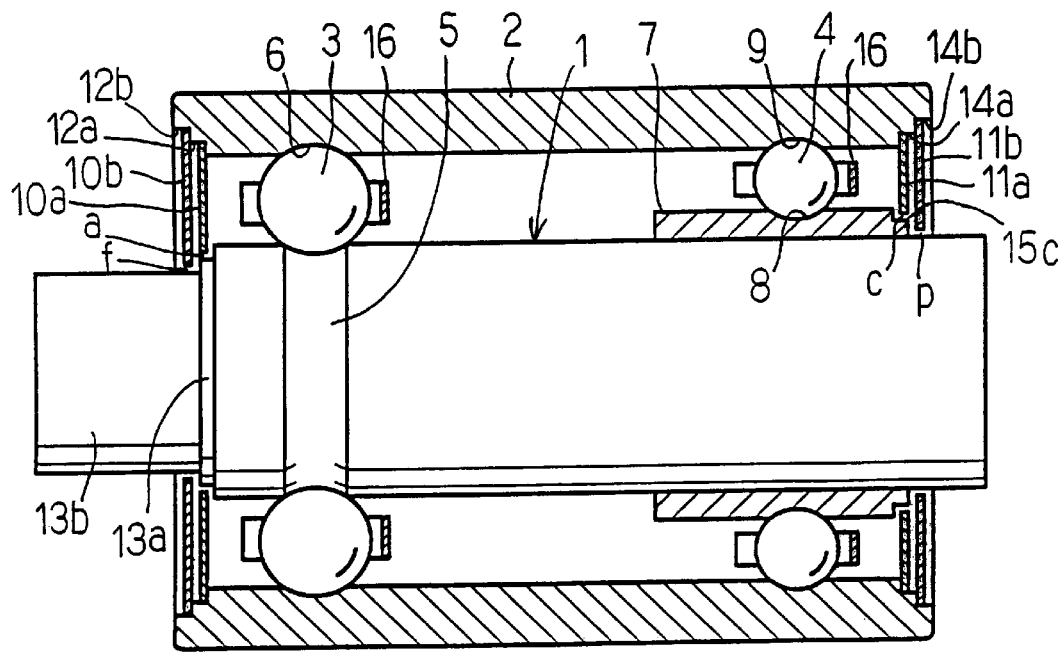
FIG. 6 is an longitudinal sectional view of the compound bearing apparatus in accordance with the sixth embodiment of the present invention.

The sixth embodiment of the compound ball bearing apparatus of the present invention will now be described with reference to FIG. 6. In the side of the apparatus in which the first row of balls 3 is provided (the left side of FIG. 6), the inner sealing plate 10a is secured at its outer peripheral portion by means of adhesive to the end face of the inner recess 12a of the sleeve 2 with leaving a slight clearance (a) between the inner peripheral portion thereof and the outer peripheral surface of the inner reduced diameter portion 13a of the shaft 1 to avoid contacting of the sealing plate with the shaft 1. Thus, a labyrinth seal function can be obtained.

The outer sealing plate 10b is secured at its outer peripheral portion by means of adhesive to the end face of the outer recess 12b of the sleeve 2 with leaving a slight clearance (f) between the inner peripheral portion thereof and the outer reduced diameter portion 13b of the shaft 1 to avoid contacting of the sealing plate with the shaft 1. Thus, a labyrinth seal function can be obtained.

In the side of the apparatus in which the second row of balls 4 is provided (the right side of FIG. 6), the inner sealing plate 11a is secured at its outer peripheral portion by means of adhesive to the end face of the inner recess 14a of the sleeve 2 with leaving a slight clearance (c) between the inner peripheral portion thereof and the reduced diameter portion 15c of the inner ring 7 to avoid contacting of the sealing plate with the inner ring 7. Thus, a labyrinth seal function can be obtained.

The outer sealing plate 11b is secured at its outer peripheral portion by means of adhesive to the end face of the outer recess 14b of the sleeve 2 with leaving a slight clearance (p) between the inner peripheral portion thereof and the outer peripheral surface of the shaft 1 and with leaving a slight axial clearance (q) between the interior surface thereof and the outer end face of the inner ring 7 to avoid contacting of the sealing plate with the inner ring 7 and the shaft 1. Thus, a labyrinth seal function can be obtained.

In the above mentioned sixth embodiment of the invention, adhesive is also used to secure the sealing plates. However, so called press fit operation can be employed to secure the sealing plates as mentioned below. In such an instance, each of the inner and outer sealing plates 10a and 10b are adapted to be press fitted into the inner and outer recesses 12a and 12b respectively, and each of the inner and outer sealing plates 11a and 11b are adapted to be press fitted into the inner and outer recesses 14a and 14b of the sleeve 2 respectively.

The Seventh Embodiment of the Invention

Figure 7:
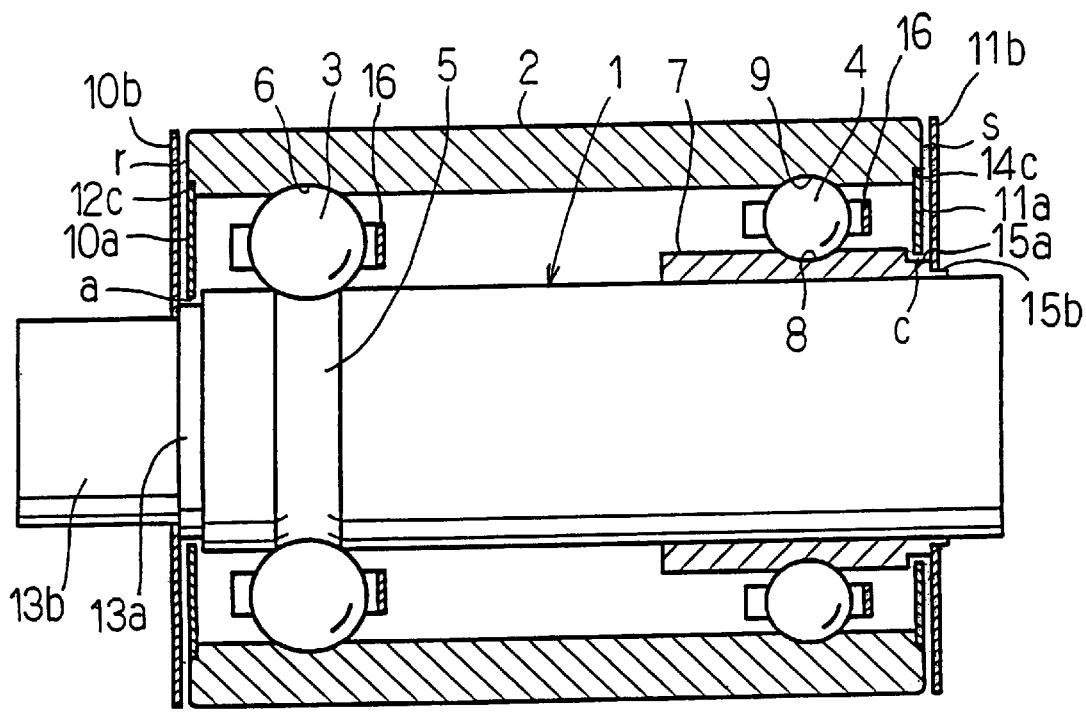
FIG. 7 is an longitudinal sectional view of the compound bearing apparatus in accordance with the seventh embodiment of the present invention.

The seventh embodiment of the compound ball bearing apparatus of the present invention will now be described with reference to FIG. 7. The apparatus in accordance with the seventh embodiment is different in the structure of the sleeve outer ring 2 and the outer sealing plates 10b and 11b from those of the above-mentioned embodiments.

In other words, the sleeve outer ring 2 modified in accordance with the seventh embodiment is provided at each end thereof with recesses 12c and 14c respectively, and the outer diameter of each of the outer sealing plates 10b and 11b is same as, or slightly smaller than that of the sleeve outer ring 2.

In the side of the apparatus in which the first row of balls 3 is provided (the left side of FIG. 7), the inner sealing plate 10a is secured at its outer peripheral portion by means of adhesive to the end face of the recess 12c of the sleeve 2 with leaving a slight clearance (a) between the inner peripheral portion thereof and the outer peripheral surface of the inner reduced diameter portion 13a of the shaft 1 to avoid contacting of the sealing plate with the shaft 1. Thus, a labyrinth seal function can be obtained.

The outer sealing plate 10b is secured at its inner peripheral portion by means of adhesive to the outer reduced diameter portion 13b of the shaft 1 with leaving a slight axial clearance (r) between the interior surface thereof and the outer end face of the sleeve outer ring 2 to avoid contacting of the sealing plate with the sleeve 2. Thus, a labyrinth seal function can be obtained.

In the side of the apparatus in which the second row of balls 4 is provided (the right side of FIG. 7), the inner sealing plate 11a is secured at its outer peripheral portion by means of adhesive to the end face of the recess 14c of the sleeve 2 with leaving a slight clearance (c) between the inner peripheral portion thereof and the inner reduced diameter portion 15a of the inner ring 7 to avoid contacting of the sealing plate with the inner ring 7. Thus, a labyrinth seal function can be obtained.

The outer sealing plate 11b is secured at its inner peripheral portion by means of adhesive to the outer reduced diameter portion 15b of the inner ring 7 with leaving a slight axial clearance (s) between the interior surface of its outer peripheral portion and the outer end face of the sleeve outer ring 2 to avoid contacting of the sealing plate with the sleeve 2. Thus, a labyrinth seal function can be obtained.

In the above mentioned seventh embodiment of the invention, adhesive is also used to secure the sealing plates. However, so called press fit operation can be employed to secure the sealing plates as mentioned below. In such an instance, the inner sealing plate 10a is adapted to be press fitted into the recesses 12c of the sleeve 2, the outer sealing plate 10b is adapted to be press fitted onto the outer reduced diameter portion 13b of the shaft 1, the inner sealing plates 11a is adapted to be press fitted into the recesses 14c of the sleeve 2, and the outer sealing plates 11b is adapted to be press fitted onto the outer reduced diameter portion 15b of the inner ring 7.

The Eighth Embodiment of the Invention

Figure 8:
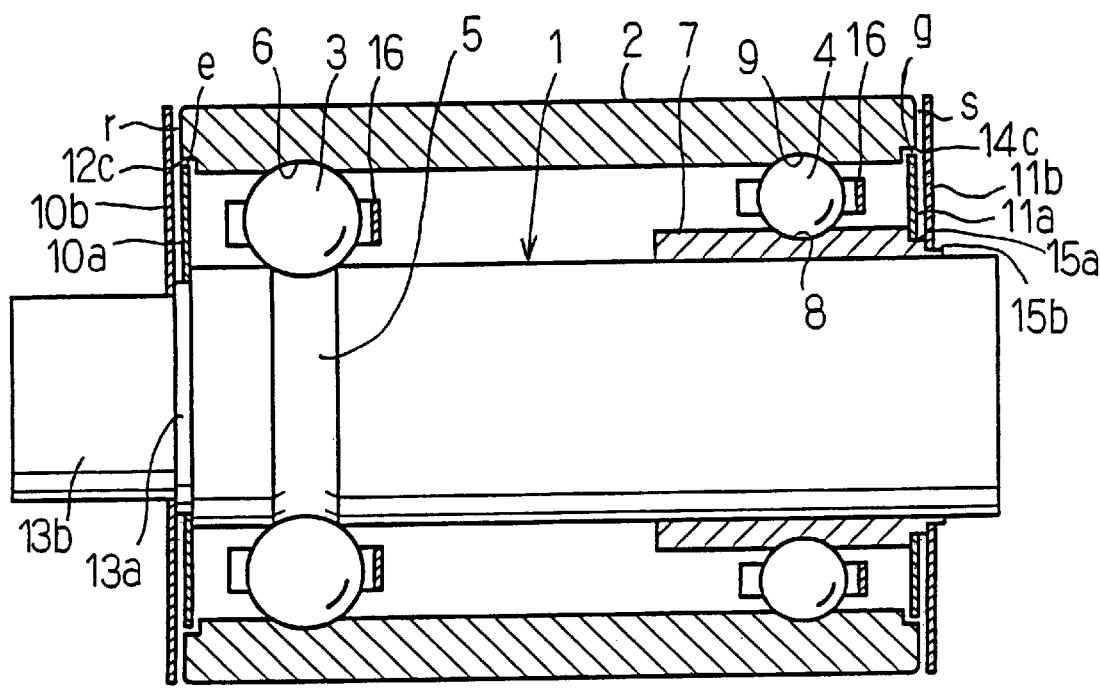
FIG. 8 is an longitudinal sectional view of the compound bearing apparatus in accordance with the eighth embodiment of the present invention.

The eighth embodiment of the compound ball bearing apparatus of the present invention will now be described with reference to FIG. 8. In the side of the apparatus in which the first row of balls 3 is provided (the left side of FIG. 8), the inner sealing plate 10a is secured at its inner peripheral portion by means of adhesive to the outer peripheral surface of the inner reduced diameter portion 13a of the shaft 1 with leaving a slight clearance (e) between the outer peripheral portion thereof and the recess 12a of the sleeve outer race 2 to avoid contacting of the sealing plate with the sleeve 2. Thus, a labyrinth seal function can be obtained.

The outer sealing plate 10b is secured at its inner peripheral portion by means of adhesive to the outer reduced diameter portion 13b of the shaft 1 with leaving a slight axial clearance (r) between the interior surface thereof and the outer end face of the sleeve outer ring 2 to avoid contacting of the sealing plate with the sleeve 2. Thus, a labyrinth seal function can be obtained.

In the side of the apparatus in which the second row of balls 4 is provided (the right side of FIG. 8), the inner sealing plate 11a is secured at its inner peripheral portion by means of adhesive to the end face of the inner reduced diameter portion 15a of the inner ring 7 with leaving a slight clearance (g) between the outer peripheral portion thereof and the inner recess 14c of the sleeve to avoid contacting of the sealing plate with the sleeve 2. Thus, a labyrinth seal function can be obtained.

The outer sealing plate 11b is secured at its inner peripheral portion by means of adhesive to the outer reduces diameter portion 15b of the inner ring 7 with leaving a slight axial clearance (s) between the interior surface of its outer peripheral portion and the outer end face of the sleeve outer ring 2 to avoid contacting of the sealing plate with the sleeve 2. Thus, a labyrinth seal function can be obtained.

In the above mentioned eighth embodiment of the invention, adhesive is also used to secure the sealing plates. However, so called press fit operation can be employed to secure the sealing plates as mentioned below. In such an instance, each of the inner and outer sealing plates 10a and 10b is adapted to be press fitted onto the inner and outer reduced diameter portion 13a and 13b of the shaft 1 respectively, and each of the inner and outer sealing plates 11a and 11b is adapted to be press fitted onto the inner and outer reduced diameter portion 15a and 15b of the inner ring 7 respectively.

The Ninth Embodiment of the Invention

Figure 9:
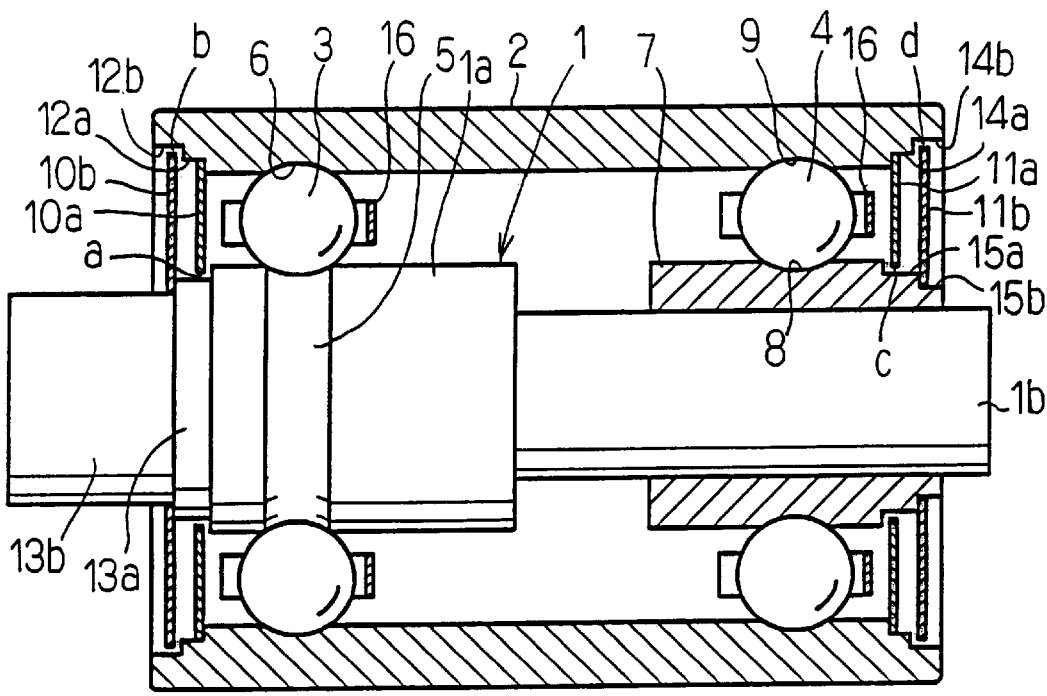
FIG. 9 is an longitudinal sectional view of the compound bearing apparatus in accordance with the ninth embodiment of the present invention.

The ninth embodiment of the compound ball bearing apparatus of the present invention will now be described with reference to FIG. 9. The ball bearing apparatus of this embodiment is a compound ball bearing comprising a two-stepped shaft 1' including an enlarged diameter shaft portion 1a and a reduced diameter shaft portion 1b, and two rows of balls 3, 4 disposed between a shaft 1' and a sleeve outer race 2 surrounding the shaft. The balls 3 of the first row are interposed between an outer rolling contact recess 5 formed directly into the outer peripheral surface of the enlarged diameter shaft portion 1a of the shaft 1' and a first inner rolling contact recess 6 formed on the inner peripheral surface of the sleeve 2. The balls 4 of the second row are interposed between an outer rolling contact recess 8 formed on the outer peripheral surface of an inner ring 7 fitted onto the reduced diameter shaft portion 1b of the shaft 1' and a second inner rolling contact recess 9 formed on the inner peripheral surface of the sleeve 2.

The diameter of the enlarged diameter shaft portion 1a is same as that of the inner ring 7 fitted onto reduced diameter shaft portion, so that the balls of the same diameter can be employed in both of the first and second row of balls.

At the one end of the sleeve outer race 2 where the first row of balls 3 (the left side of FIG. 9) are provided, the clearance defined between the enlarged diameter shaft portion 1a and the end portion of the sleeve 2 is adapted to be closed by a pair of annular sealing plates 10a, 10b. Similarly, at the other end of the sleeve 2 where the second row of balls 4 (the right side of FIG. 9) are provided, the clearance defined between the sleeve 2 and the inner ring 7 is adapted to be closed by a pair of annular sealing plates 11a, 11b.

In the side of the apparatus in which the first row of balls 3 is provided, the sleeve 2 has a pair of stepped recess 12a and 12b, and the enlarged diameter shaft portion 1a of the two-stepped shaft 1' has a pair of inner and outer reduced diameter portions 13a and 13b formed in the stepped manner. The inner sealing plate 10a is secured at its outer peripheral portion by means of adhesive to the end face of the inner recess 12a of the sleeve 2 with leaving a slight clearance (a) between the inner peripheral portion thereof and the outer peripheral surface of the inner reduced diameter portion 13a of the shaft 1 to avoid contacting of the sealing plate with the two-stepped shaft 1'. Thus, a labyrinth seal function can be obtained.

The outer sealing plate 10b is secured at its inner peripheral portion by means of adhesive to the outer reduced diameter portion 13b of the enlarged diameter shaft portion 1a with leaving a slight clearance (b) between the outer peripheral portion thereof and the outer recess 12b of the sleeve 2 to avoid contacting of the sealing plate with the sleeve. Thus, a labyrinth seal function can be obtained.

In the side of the apparatus is which the second row of balls 4 is provided, the sleeve 2 has a pair of stepped recess 14a and 14b, and the inner ring 7 provided on the shaft 1 has a pair of inner and outer reduced diameter portions 15a and 15b formed in the stepped manner. The inner sealing plate 11a is secured at its outer peripheral portion by means of adhesive to the end face of the inner recess 14a of the sleeve 2 with leaving a slight clearance (c) between the inner peripheral portion thereof and the inner reduced diameter portion 15a of the inner ring 7 to avoid contacting of the sealing plate with the inner ring 7. Thus, a labyrinth seal function can be obtained.

The outer sealing plate 11b is secured at its inner peripheral portion by means of adhesive to the outer reduced diameter portion 15b of the inner ring 7 with leaving a slight clearance (d) between the outer peripheral portion thereof and the outer recess 14b of the sleeve 2 to avoid contacting of the sealing plate with the inner ring. Thus, a labyrinth seal function can be obtained.

Upon assembling the above mentioned compound bearing apparatus, balls 3 of the first row are disposed between the outer rolling contact recess 5 of the enlarged diameter shaft portion 1a of the two-stepped shaft 1' and the inner rolling contact recess 6 of the sleeve outer race 2, the inner ring 7 is slidably fitted of the reduced diameter shaft portion 1b of the shaft 1', balls 4 of the second row are disposed between the outer rolling contact recess 8 of the inner ring 7 and the second inner rolling contact recess 9 of the sleeve outer race 2, and then the inner ring 7 is secured to the reduced diameter shaft portion 1b by means of adhesive with applying an appropriate stress to the outer end face of the inner ring 7. The securing operation of the sealing plates are effected after completed the above mentioned assembling operation.

The apparatus of this embodiment will provide the advantage that the balls of the same diameter can be employed in both of the first and second row of balls.

Although adhesive is used to secure the sealing plates in the above mentioned ninth embodiment of the invention, so called press fit operation can be employed to secure the sealing plates as mentioned below. In such an instance, the inner sealing plate 10a is adapted to be press fitted into the inner recess 12a of sleeve 2, the outer sealing plate 10b is adapted to the press fitted onto the outer reduced diameter portion 13a of the enlarged diameter shaft portion 1a, the inner sealing plate 11a is adapted to be press fitted into the inner recess 14a of sleeve 2, and the outer sealing plate 11b is adapted to be press fitted onto the outer reduced diameter portion 15b of the inner ring 7.

The Tenth Embodiment of the Invention

Figure 10:
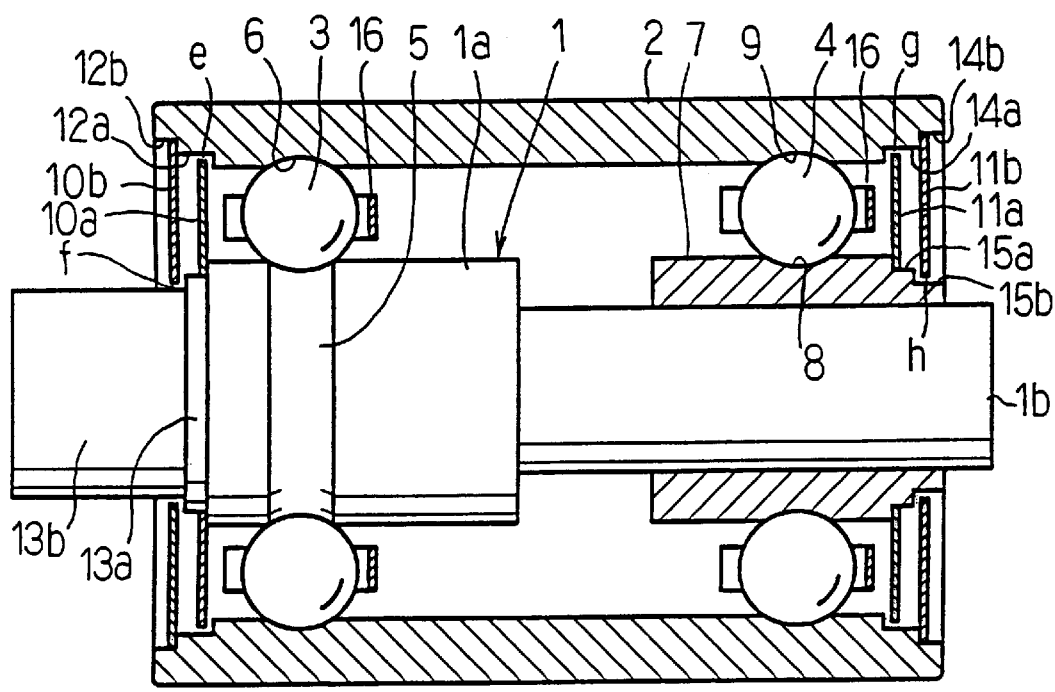
FIG. 10 is an longitudinal sectional view of the compound bearing apparatus in accordance with the tenth embodiment of the present invention.

The tenth embodiment of the compound ball bearing apparatus of the present invention will now be described with reference to FIG. 10. In the side of the apparatus in which the first row of balls 3 is provided (the left side of FIG. 10), the inner sealing plate 10a is secured at its inner peripheral portion by means of adhesive to the outer peripheral surface of the reduced diameter portion 13a of the enlarged diameter shaft portion 1a with leaving a slight clearance (e) between the outer peripheral portion thereof and the inner recess 12a of the sleeve outer race 2 to avoid contacting of the sealing plate with the sleeve. Thus, a labyrinth seal function can be obtained.

The outer sealing plate 10b is secured at its outer peripheral portion by means of adhesive to the outer recess 12b of the sleeve 2 with leaving a slight clearance (f) between the inner peripheral portion thereof and the outer reduced diameter portion 13b of the enlarged diameter shaft portion 1a to avoid contacting of the sealing plate with the two-stepped shaft 1'. Thus, a labyrinth seal function can be obtained.

In the side of the apparatus in which the tenth row of balls 4 is provided (the right side of FIG. 10), the inner sealing plate 11a is secured at its inner peripheral portion by means of adhesive to the inner reduced diameter portion 15a of the inner ring 7 with leaving a slight clearance (g) between the outer peripheral portion thereof and the inner recess 14a of the sleeve 2 to avoid contacting of the sealing plate with the sleeve. Thus, a labyrinth seal function can be obtained.

The outer sealing plate 11b is secured at its outer peripheral portion by means of adhesive to the end face of the outer recess 14b with leaving a slight clearance (h) between the inner peripheral portion thereof and the outer reduced diameter portion 15b to avoid contacting of the sealing plate with the inner ring 7. Thus, a labyrinth seal function can be obtained.

In the above mentioned tenth embodiment of the invention, adhesive is also used to secure the sealing plates. However, so called press fit operation can be employed to secure the sealing plates as mentioned below. In such an instance, the inner sealing plate 10a is adapted to be press fitted onto the outer reduced diameter portion 13a of the enlarged diameter shaft portion 1a, the outer sealing plate 10b is adapted to be press fitted into the outer recess 12b, the inner sealing plate 11a is adapted to be press fitted onto the inner reduced diameter portion 15a of the inner ring 7, and the outer sealing plate 11b is adapted to be press fitted into the inner recess 14a of the sleeve 2.

The Eleventh Embodiment of the Invention

Figure 11:
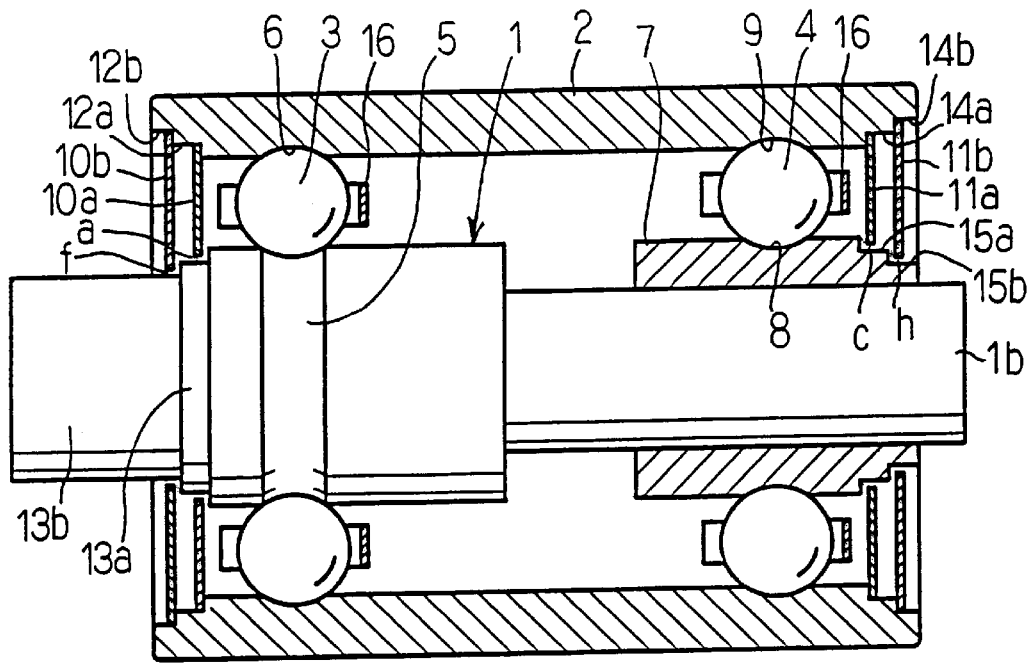
FIG. 11 is an longitudinal sectional view of the compound bearing apparatus in accordance with the eleventh embodiment of the present invention.

The eleventh embodiment of the compound ball bearing apparatus of the present invention will now be described with reference to FIG. 11. In the side of the apparatus in which the first row of balls 3 is provided (the left side of FIG. 11), the inner sealing plate 10a is secured at its outer peripheral portion by means of adhesive to the end face of the inner recess 12a of the sleeve 2 with leaving a slight clearance (a) between the inner peripheral portion thereof and the inner reduced diameter portion 13a of the enlarged diameter shaft portion 1a to avoid contacting of the sealing plate with the two-stepped shaft 1'. Thus, a labyrinth seal function can be obtained.

The outer sealing plate 10b is secured at its outer peripheral portion by means of adhesive to the outer recess 12b of the sleeve 2 with leaving a slight clearance (f) between the inner peripheral portion thereof and the outer reduced diameter portion 13b of the enlarged diameter shaft portion 1a to avoid contacting of the sealing plate with the two-stepped shaft 1'. Thus, a labyrinth seal function can be obtained.

In the side of the apparatus in which the second row of balls 4 is provided (the right side of FIG. 11), the inner sealing plate 11a is secured at its outer peripheral portion by means of adhesive to the end face of the inner recess 14a of the sleeve 2 with leaving a slight clearance (c) between the inner peripheral portion thereof and the outer peripheral surface of the inner reduced diameter portion 15a of the inner ring 7 to avoid contacting of the sealing plate with the inner ring 7. Thus, a labyrinth seal function can be obtained.

The outer sealing plate 11b is secured at its outer peripheral portion by means of adhesive to the end face of the outer recess 14b of the sleeve 2 with leaving a slight clearance (h) between the inner peripheral portion thereof and the outer reduced diameter portion 15b of the inner ring 7 to avoid contacting of the sealing plate with the inner ring 7. Thus, a labyrinth seal function can be obtained.

In the above mentioned eleventh embodiment of the invention, adhesive is also used to secure the sealing plates. However, so called press fit operation can be employed to secure the sealing plates as mentioned below. In such an instance, each of the inner and outer sealing plates 10a and 10b are adapted to be press fitted into the inner and outer recesses 12a and 12b respectively, and each of the inner and outer sealing plates 11a and 11b are also adapted to be press fitted into the inner and outer recesses 14a and 14b of the sleeve 2 respectively.

The Twelfth Embodiment of the Invention

Figure 12:
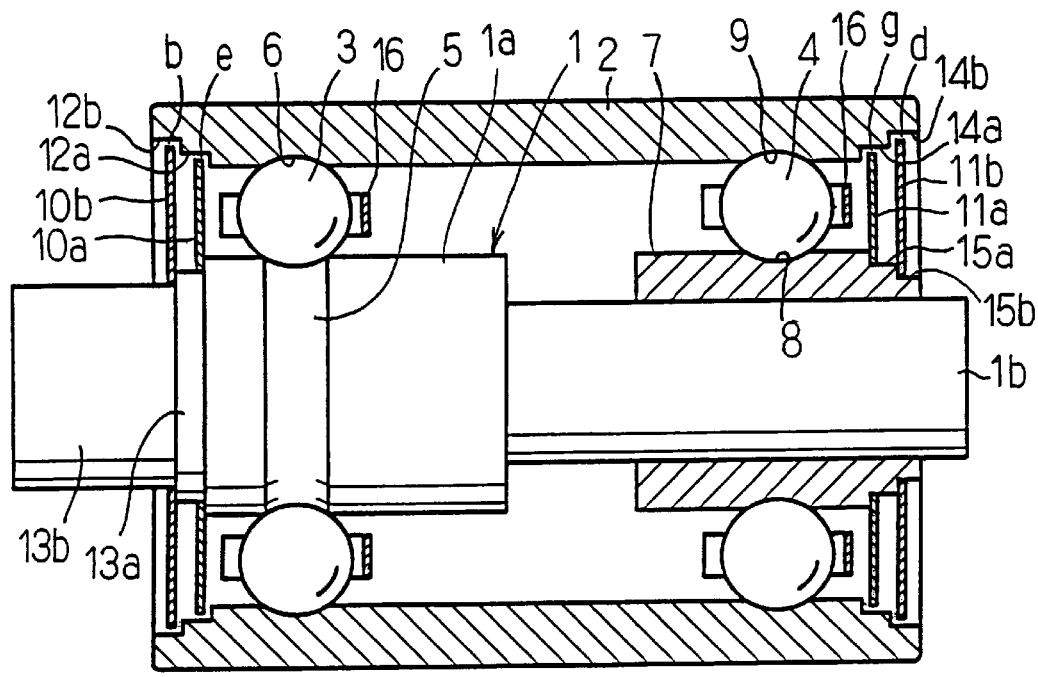
FIG. 12 is an longitudinal sectional view of the compound bearing apparatus in accordance with the twelfth embodiment of the present invention.

The twelfth embodiment of the compound ball bearing apparatus of the present invention will now be described with reference to FIG. 12. In the side of the apparatus in which the first row of balls 3 is provided (the left side of FIG. 12), the inner sealing plate 10a is secured at its inner peripheral portion by means of adhesive to the outer peripheral surface of the inner reduced diameter portion 13a of the enlarged diameter shaft portion 1a with leaving a slight clearance (e) between the outer peripheral portion thereof and the inner recess 12a of the sleeve outer race 2 to avoid contacting of the sealing plate with the sleeve 2. Thus, a labyrinth seal function can be obtained.

The outer sealing plate 10b is secured at its inner peripheral portion by means of adhesive to the outer reduced diameter portion 13b of the enlarged diameter shaft portion 1a with leaving a slight clearance (b) between the outer peripheral portion thereof and the outer recess 12b of the sleeve 2 to avoid contacting of the sealing plate with the sleeve. Thus, a labyrinth seal function can be obtained.

In the side of the apparatus in which the second row of balls 4 is provided (the right side of FIG. 12), the inner sealing plate 11a is secured at its inner peripheral portion by means of adhesive to the outer peripheral surface of the inner reduced diameter portion 15a of the inner ring 7 with leaving a slight clearance (g) between the outer peripheral portion thereof and the inner recess 14a of the sleeve 2 to avoid contacting of the sealing plate with the sleeve 2. Thus, a labyrinth seal function can be obtained.

The outer sealing plate 11b is secured at its inner peripheral portion by means of adhesive to the outer peripheral surface of the outer reduced diameter portion 15b of the inner ring 7 with leaving a slight clearance (d) between the outer peripheral portion thereof and the outer recess 14b of the sleeve 2 to avoid contacting of the sealing plate with the sleeve outer race. Thus, a labyrinth seal function can be obtained.

In the above mentioned twelfth embodiment of the invention, adhesive is also used to secure the sealing plates. However, so called press fit operation can be employed to secure the sealing plates as mentioned below. In such an instance, each of the inner and outer sealing plates 10a and 10b are adapted to be press fitted onto the inner and outer reduced diameter portion 13a and 13b respectively, and each of the inner and outer sealing plates 11a and 11b are adapted to be press fitted onto the inner and outer reduced diameter portion 15a and 15b of the inner ring 7 respectively.

The Thirteenth Embodiment of the Invention

The thirteenth embodiment of the compound ball bearing apparatus of the present invention will now be described with reference to FIG. 13. In the side of the apparatus in which the first row of balls 3 is provided (the left side of FIG. 13), the inner sealing plate 10a is secured at its inner peripheral portion by means of adhesive to the outer peripheral surface of the reduced diameter portion 13a of the enlarged diameter shaft portion 1a with leaving a slight clearance (e) between the outer peripheral portion thereof and the inner recess 12a of the sleeve outer race 2 to avoid contacting of the sealing plate with the sleeve 2. Thus, a labyrinth seal function can be obtained.

The outer sealing plate 10b is secured at its outer peripheral portion by means of adhesive to the outer recess 12b of the sleeve 2 with leaving a slight clearance (f) between the inner peripheral portion thereof and the outer reduced diameter portion 13b of the enlarged diameter shaft portion 1a to avoid contacting of the sealing plate with the two-stepped shaft 1'. Thus, a labyrinth seal function can be obtained.

Figure 13:
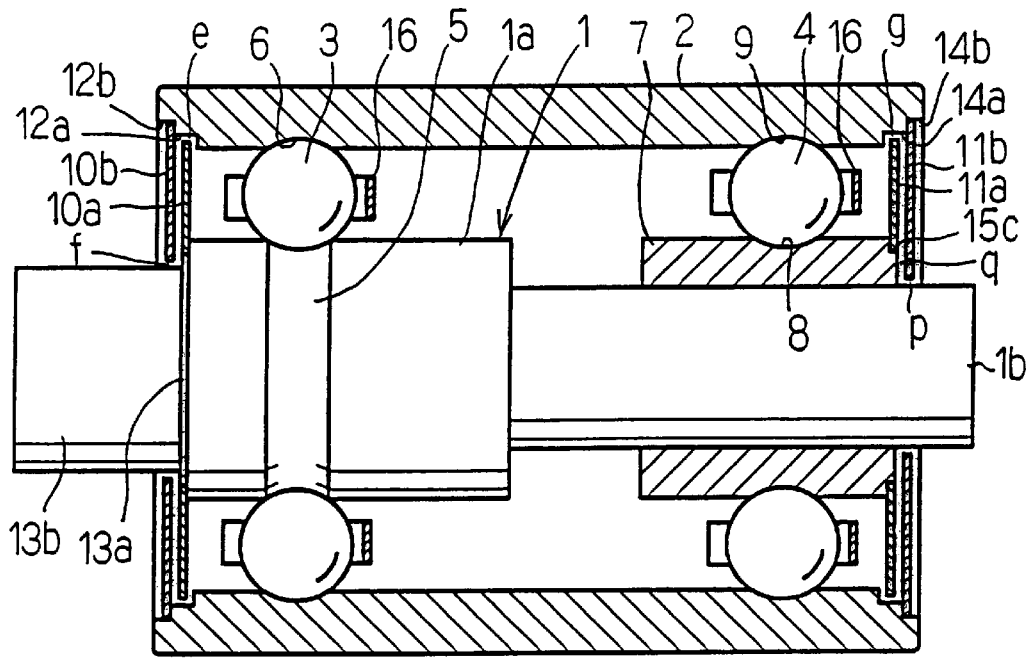
FIG. 13 is an longitudinal sectional view of the compound bearing apparatus in accordance with the thirteenth embodiment of the present invention.

In the side of the apparatus in which the second row of balls 4 is provided (the right side of FIG. 13), the apparatus in accordance with the embodiment as shown in FIG. 13 is different in the structure of the inner ring 7 and the outer sealing plate 11b from those of the above-mentioned embodiments.

In other words, only one reduced diameter portion 15c is provided on the inner ring 7, and the inner sealing plate 11a is secured at its inner peripheral portion by means of adhesive to the end face of the reduced diameter portion 15c with leaving a slight clearance (g) between the outer peripheral portion thereof and the inner recess 14a of the sleeve outer race 2 to avoid contacting of the sealing plate with the sleeve 2. Thus, a labyrinth seal function can be obtained.

The diameter of the inner peripheral portion of the outer sealing plate 11b is dimensioned so as to be slightly larger than that of the bore provided through the inner ring 7 for accommodating the shaft 1, i.e. the outer diameter of the reduced diameter shaft portion 1b of the two-stepped shaft 1'. The outer sealing plate 11b is secured at its outer peripheral portion by means of adhesive to the end face of the outer recess 14b of the sleeve 2 with leaving a slight clearance (p) between the inner peripheral portion thereof and the outer peripheral surface of the reduced diameter shaft portion 1b of the shaft 1' and with leaving a slight axial clearance (q) between the interior surface thereof and the outer end face of the inner ring 7 to avoid contacting of the sealing plate with the inner ring 7 and the two-stepped shaft 1'. Thus, a labyrinth seal function can be obtained.

In the above mentioned thirteenth embodiment of the invention, adhesive is also used to secure the sealing plates. However, so called press fit operation can be employed to secure the sealing plates as mentioned below. In such an instance, the inner sealing plate 10a is adapted to be press fitted onto the inner reduced diameter portion 13a of the enlarged diameter shaft portion 1a, the outer sealing plate 10b is adapted to be press fitted into the outer recess 12b of the sleeve 2, the inner sealing plate 11a is adapted to be press fitted onto the reduced diameter portion 15c of the inner ring 7, and the outer sealing plate 11b is adapted to be press fitted into the outer recess 14b of the sleeve 2.

The Fourteenth Embodiment of the Invention

Figure 14:
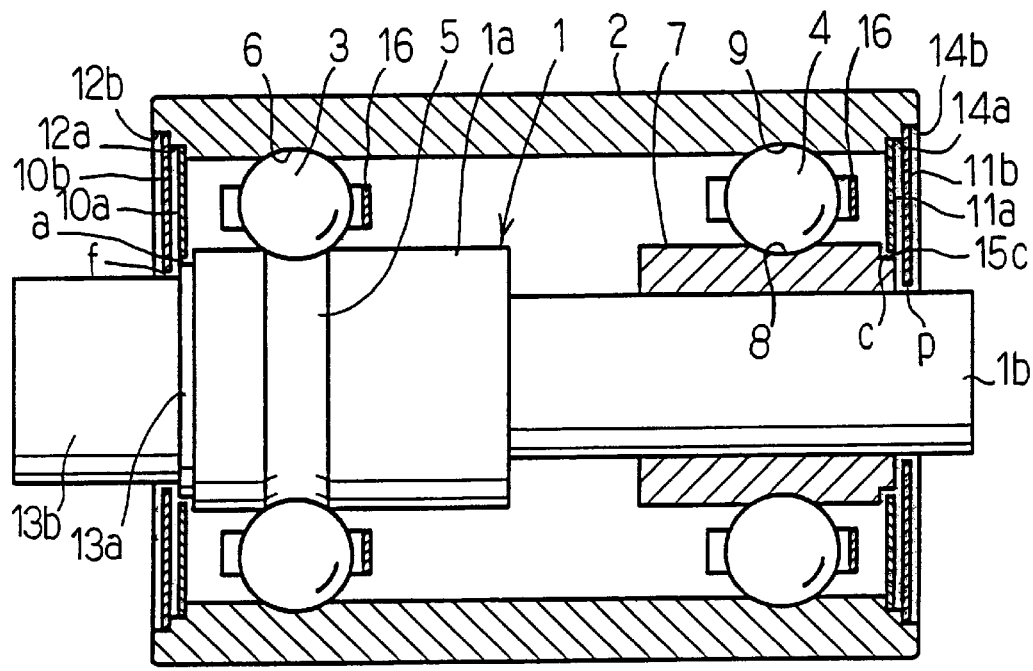
FIG. 14 is an longitudinal sectional view of the compound bearing apparatus in accordance with the fourteenth embodiment of the present invention.

The fourteenth embodiment of the compound ball bearing apparatus of the present invention will now be described with reference to FIG. 14. In the side of the apparatus in which the first row of balls 3 is provided (the left side of FIG. 14), the inner sealing plate 10a is secured at its outer peripheral portion by means of adhesive to the end face of the inner recess 12a of the sleeve 2 with leaving a slight clearance (a) between the inner peripheral portion thereof and the outer peripheral surface of the inner reduced diameter portion 13a of the two-stepped shaft 1' to avoid contacting of the sealing plate with the two-stepped shaft 1'. Thus, a labyrinth seal function can be obtained.

The outer sealing plate 10b is secured at its outer peripheral portion by means of adhesive to the end face of the outer recess 12b of the sleeve 2 with leaving a slight clearance (f) between the inner peripheral portion thereof and the outer reduced diameter portion 13b of the two-stepped shaft 1' to avoid contacting of the sealing plate with the two-stepped shaft 1'. Thus, a labyrinth seal function can be obtained.

In the side of the apparatus in which the second row of balls 4 is provided (the right side of FIG. 14), the inner sealing plate 11a is secured at its outer peripheral portion by means of adhesive to the end face of the inner recess 14a of the sleeve 2 with leaving a slight clearance (c) between the inner peripheral portion thereof and the reduced diameter portion 15c of the inner ring 7 to avoid contacting of the sealing plate with the inner ring 7. Thus, a labyrinth seal function can be obtained.

The outer sealing plate 11b is secured at its outer peripheral portion by means of adhesive to the end face of the outer recess 14b of the sleeve 2 with leaving a slight clearance (p) between the inner peripheral portion thereof and the outer peripheral surface of the reduced diameter shaft portion 1b of the two-stepped shaft 1' and with leaving a slight axial clearance (q) between the interior surface thereof and the outer end face of the inner ring 7 to avoid contacting of the sealing plate with the inner ring 7 and the two-stepped shaft 1'. Thus, a labyrinth seal function can be obtained.

In the above mentioned fourteenth embodiment of the invention, adhesive is also used to secure the sealing plates. However, so called press fit operation can be employed to secure the sealing plates as mentioned below. In such an instance, each of the inner and outer sealing plates 10a and 10b are adapted to be press fitted into the inner and outer recesses 12a and 12b respectively, and each of the inner and outer sealing plates 11a and 11b are adapted to be press fitted into the inner and the outer recesses 14a and 14b of the sleeve 2 respectively.

The Fifteenth Embodiment of the Invention

Figure 15:
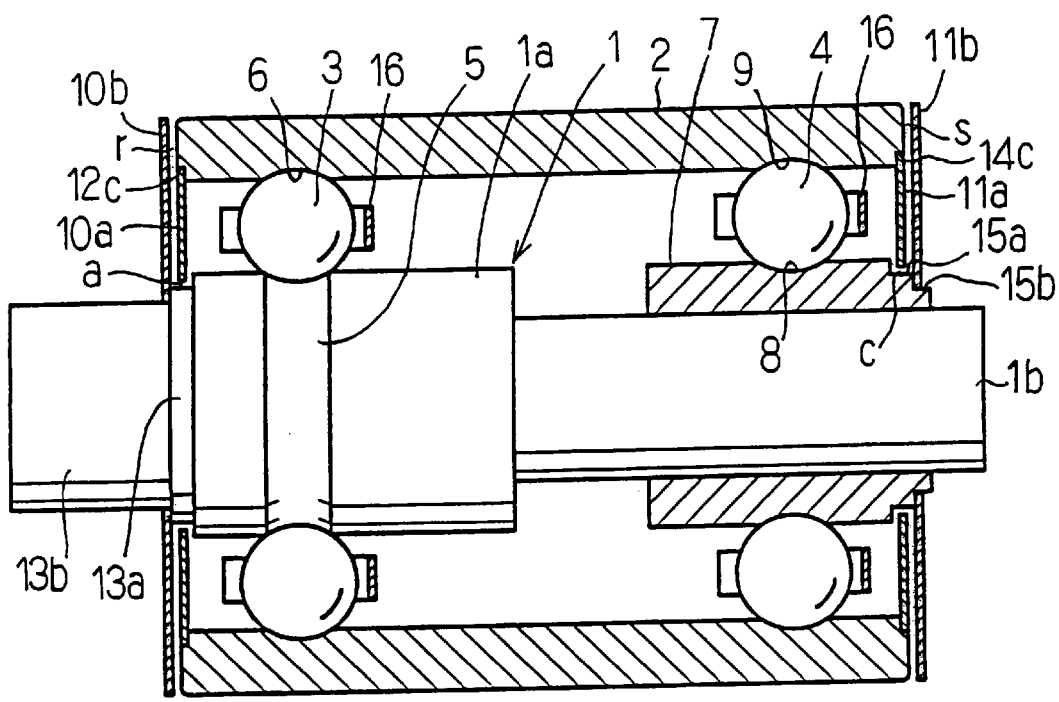
FIG. 15 is an longitudinal sectional view of the compound bearing apparatus in accordance with the fifteenth embodiment of the present invention.

The fifteenth embodiment of the compound ball bearing apparatus of the present invention will now be described with reference to FIG. 15. The apparatus in accordance with the fifteenth embodiment is different in the structure of the sleeve outer ring 2 and the outer sealing plates 10b and 11b from those disclosed in the 9–14 embodiments.

The sleeve outer ring 2 is provided at each end thereof with recesses 12c and 14c respectively, and the outer diameter of each of the outer sealing plates 10b and 11b is same as, or slightly smaller than that of the sleeve outer ring 2.

In the side of the apparatus in which the first tow of balls 3 is provided (the left side of FIG. 15), the inner sealing plate 10a is secured at its outer peripheral portion by means of adhesive to the end face of the recess 12c of the sleeve 2 with leaving a slight clearance (a) between the inner peripheral portion thereof and the outer peripheral surface of the inner reduced diameter portion 13a of the two-stepped shaft 1' to avoid contacting of the sealing plate with the two-stepped shaft 1'. Thus, a labyrinth seal function can be obtained.

The outer sealing plate 10b is secured at its inner peripheral portion by means of adhesive to the outer reduced diameter portion 13b of the two-stepped shaft 1' with leaving a slight axial clearance (r) between the interior surface thereof and the outer end face of the sleeve outer ring 2 to avoid contacting of the sealing plate with the sleeve 2. Thus, a labyrinth seal function can be obtained.

In the side of the apparatus in which the second row of balls 4 is provided (the right side of FIG. 15), the inner sealing plate 11a is secured at its outer peripheral portion by means of adhesive to the end face of the recess 14c of the sleeve 2 with leaving a slight clearance (c) between the inner peripheral portion thereof and the inner reduced diameter portion 15a of the inner ring 7 to avoid contacting of the sealing plate with the inner ring 7. Thus, a labyrinth seal function can be obtained.

The outer sealing plate 11b is secured at its inner peripheral portion by means of adhesive to the outer reduced diameter portion 15b of the inner ring 7 with leaving a slight axial clearance (s) between the interior surface of its outer peripheral portion and the outer end face of the sleeve outer ring 2 to avoid contacting of the sealing plate with the sleeve 2. Thus, a labyrinth seal function can be obtained.

In the above mentioned fifteenth embodiment of the invention, adhesive is also used to secure the sealing plates. However, so called press fit operation can be employed to secure the sealing plates as mentioned below. In such an instance, the inner sealing plate 10a is adapted to be press fitted into the recesses 12c of the sleeve 2, the outer sealing plate 10b is adapted to be press fitted onto the outer reduced diameter portion 13b of the enlarged diameter shaft portion 1a, the inner sealing plates 11a is adapted to be press fitted into the recesses 14c of the sleeve 2, and the outer sealing plates 11b is adapted to be press fitted onto the outer reduced diameter portion 15b of the inner ring 7.

The Sixteenth Embodiment of the Invention

Figure 16:
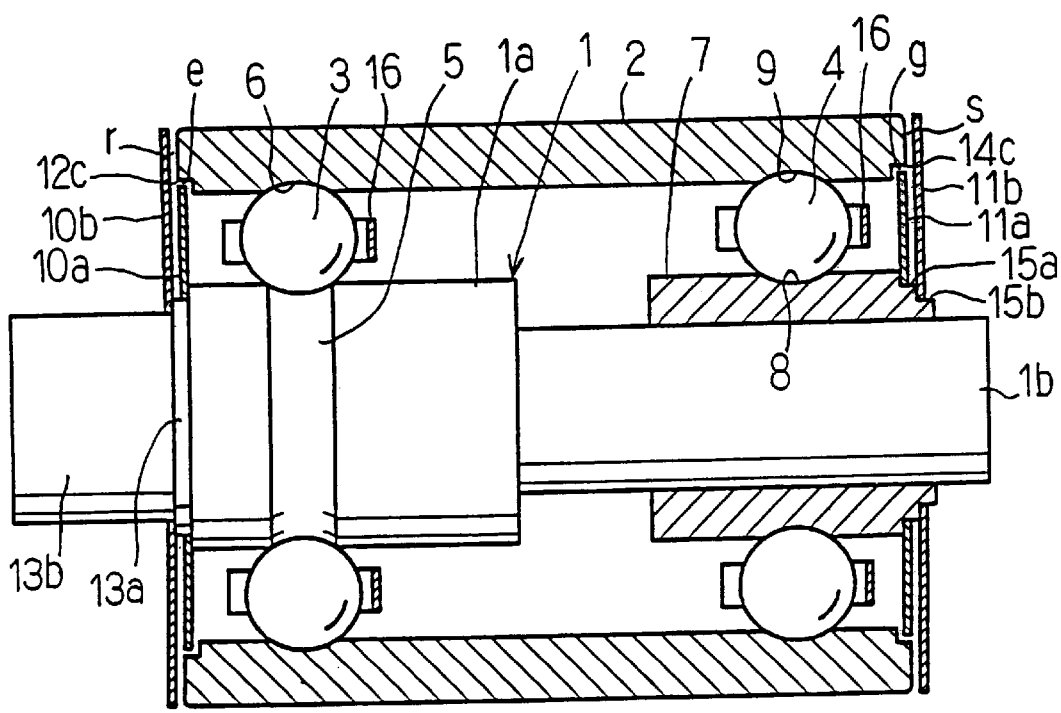
FIG. 16 is an longitudinal sectional view of the compound bearing apparatus in accordance with the sixteenth embodiment of the present invention.

The sixteenth embodiment of the compound ball bearing apparatus of the present invention will now be described with reference to FIG. 16. In the side of the apparatus in which the first row of balls 3 is provided (the left side of FIG. 16), the inner sealing plate 10a is secured at its inner peripheral portion by means of adhesive to the outer peripheral surface of the inner reduced diameter portion 13a of the two-stepped shaft 1' with leaving a slight clearance (e) between the outer peripheral portion thereof and the recess 12a of the sleeve outer race 2 to avoid contacting of the sealing plate with the sleeve 2. Thus, a labyrinth seal function can be obtained.

The outer sealing plate 10b is secured at its inner peripheral portion by means of adhesive to the outer reduced diameter portion 13b of the two-stepped shaft 1' with leaving a slight axial clearance (r) between the interior surface thereof and the outer end face of the sleeve outer ring 2 to avoid contacting of the sealing plate with the sleeve 2. Thus, a labyrinth seal function can be obtained.

In the side of the apparatus in which the second row of balls 4 is provided (the right side of FIG. 16), the inner sealing plate 11a is secured at its inner peripheral portion by means of adhesive to the end face of the inner reduced diameter portion 15a of the inner ring 7 with leaving a slight clearance (g) between the outer peripheral portion thereof and the inner recess 14c of the sleeve to avoid contacting of the sealing plate with the sleeve 2. Thus, a labyrinth seal function can be obtained.

The outer sealing plate 11b is secured at its inner peripheral portion by means of adhesive to the outer reduced diameter portion 15b of the inner ring 7 with leaving a slight axial clearance (s) between the interior surface of its outer peripheral portion and the outer end face of the sleeve outer ring 2 to avoid contacting of the sealing plate with the sleeve 2. Thus, a labyrinth seal function can be obtained.

In the above mentioned sixteenth embodiment of the invention, adhesive is also used to secure the sealing plates. However, so called press fit operation can be employed to secure the sealing plates as mentioned below. In such an instance, each of the inner and outer sealing plates 10a and 10b is adapted to be press fitted onto the inner and outer reduced diameter portion 13a and 13b of the shaft 1 respectively, and each of the inner and outer sealing plates 11a and 11b is adapted to be press fitted onto the inner and outer reduced diameter portion 15a and 15b of the inner ring 7 respectively.

In the structure of the apparatus in accordance with the above-described structure, a pair of inner and outer sealing plates are provided on both end of the apparatus. However, the apparatus in which only one end is provided with a pair of plates, and the other end is provided with one sealing plate of prior structure. The plate provided on the other end can be either of a contacting type or non-contacting type. Further, the other end can be remained unclose by providing no plates thereto.

In the apparatus of the above mentioned embodiments, adhesive or press fit operation are used to secure the sealing plates to the inner or outer ring or the shaft. In the case where the sealing plate is made of metal, or the sealing plate is made to have a core member of metal, so called caulking operation can be employed in securing the sealing plate.

In the embodiments shown and described above, the bearing utilized is a compound ball bearing. However the roller bearings, needle bearing, or fluid bearings are also utilized.

In the compound ball bearing apparatus of the present invention, the clearance defined between the sleeve outer ring and the shaft or the inner ring are sealed by a pair of sealing plates functioned as a labyrinth seal. Thus, the advantage that the lubricant employed in the bearing apparatus can be prevented from flowing out of the casing, can be obtained.

The sealing plates used in the apparatus of the present invention are on non-contacting type, i.e. there are no friction between the sealing plates and the other component. In this connection, the heat or the torque due to friction can not be produced, the sealing plates will not be worn, the leakage of the lubricant due to the wear of the sealing plate will not be happened, no wear particles can be produced. In conclusion, the compound ball bearing apparatus of the present invention can advantageously be employed in the rotating part of the spindle motor of the hard disk drive means.

The sealing plates of an annular disk shape can be manufactured easily, precisely, and inexpensively. Further, these plates are easy in their handling and assembly, so that the cost for manufacturing the bearing apparatus of the present invention can be reduced.

Moreover, there no necessity for providing an additional labyrinth seal mechanism with the equipment to which the bearing apparatus are adapted to be assembled. This also leads to the reduction of the cost for manufacturing.

In the manufacturer in which the motors or the hard disk drive means are produced by employing the compound bearing apparatus, the bearing apparatus are incorporated as they are, since the compound bearing apparatus had been manufactured in high accuracy in the manufacturer of the bearings by assembling two rows of rotating bodies. In this connection, the steps for incorporating the bearing apparatus can be simplified, so that the reduction of the cost for incorporating the bearing apparatus into the equipment can be expected.

The outer rolling contact recess for balls of the first row is formed directly on the outer periphery of the shaft, so that no inner ring are required in the side of the first row. In this connection, the outer diameter of the bearing apparatus can be reduced to miniaturizing the apparatus as a whole, and the diameter of the shaft can be enlarged to increase the rigidity of the shaft.

While particular embodiments of the present invention have been illustrated and described, it should be obvious to those skilled in the art that various changes and modifications can be made without departing from the spirit and scope of the invention.

What is claimed is:

1. A compound bearing apparatus comprising:

a shaft, a sleeve outer ring surrounding the shaft, two rows of rotating bodies disposed between the shaft and the sleeve including a first row of the rotating bodies interposed between an outer rolling contact recess formed directly on the outer periphery of the shaft and a first inner rolling contact recess formed on the inner peripheral surface of the sleeve outer ring, and a second row of the rotating bodies interposed between an outer rolling contact recess formed on the outer periphery of an inner ring fitted onto the shaft and a second inner rolling contact recess formed on the inner peripheral surface of the sleeve, and a pair of inner and outer sealing plates having a through hole at the central portion thereof; wherein at the one side of the apparatus where the first row of the rotating bodies is provided, the sealing plates are mounted between the sleeve outer ring and the shaft with leaving between the plates and the sleeve outer ring or the shaft a slight clearance sufficient to provide a labyrinth seal function, and at the other side of the apparatus where the second row of the rotating bodies is provided, the sealing plates are mounted between the sleeve outer ring and the inner ring with leaving between the plates and the sleeve outer ring or the inner ring a slight clearance sufficient to provide a labyrinth seal function.

2. The compound bearing apparatus in accordance with claim 1 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft, and the outer sealing plate is secured at its inner peripheral portion to the outer peripheral surface of the shaft with leaving a slight clearance between the outer peripheral portion thereof and the inner peripheral surface of the sleeve outer ring to avoid contacting thereof with the sleeve outer ring; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its inner peripheral portion to the outer peripheral surface of the inner ring with leaving a slight clearance between the outer peripheral portion thereof and the inner peripheral surface of the sleeve outer ring to avoid contacting thereof with the sleeve outer ring.

3. The compound bearing apparatus in accordance with claim 1 wherein, at the one side of the apparatus, the inner sealing plate is secured at its inner peripheral portion to the outer peripheral surface of the shaft with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft; and at the other side of the apparatus, the inner sealing plate is secured at its inner peripheral portion to the inner peripheral surface of the inner ring with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring.

4. The compound bearing apparatus in accordance with claim 1 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft, and the outer sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring.

5. The compound bearing apparatus in accordance with claim 1 wherein, at the one side of the apparatus, the inner sealing plate is secured at its inner peripheral portion to the outer peripheral surface of the shaft with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the shaft with leaving a slight clearance between the outer peripheral portion thereof and the inner peripheral surface of the sleeve outer ring to avoid contacting thereof with the sleeve outer ring; and at the other side of the apparatus, the inner sealing plate is secured at its inner peripheral portion to the outer peripheral surface of the inner ring with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the inner ring with leaving a slight clearance between the outer peripheral portion thereof and the inner peripheral surface of the sleeve outer ring to avoid contacting thereof with the sleeve outer ring.

6. The compound bearing apparatus in accordance with claim 1 wherein, at the one side of the apparatus, the inner sealing plate is secured at its inner peripheral portion to the outer peripheral surface of the shaft with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft; and at the other side of the apparatus, the inner sealing plate is secured at its inner peripheral portion to the inner ring with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the shaft and with leaving a slight axial clearance between the interior surface thereof and the outer end face of the inner ring to avoid contacting thereof with the inner ring and the shaft.

7. The compound bearing apparatus in accordance with claim 1 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft, and the outer sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its outer peripheral portion to the inner peripheral surface of the sleeve outer ring with leaving a slight clearance between the inner peripheral portion thereof and the outer peripheral surface of the shaft and with leaving a slight axial clearance between the interior surface thereof and the outer end face of the inner ring to avoid contacting thereof with the inner ring and the shaft.

8. The compound bearing apparatus in accordance with claim 1 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft, and the outer sealing plate is secured at its inner peripheral portion to the outer peripheral surface of the shaft with leaving a slight axial clearance between the interior surface thereof and the outer end face of the sleeve outer ring to avoid contacting thereof with the sleeve outer ring; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its inner peripheral portion to the outer peripheral surface of the inner ring with leaving a slight axial clearance between the outer peripheral portion thereof and the outer end face of the sleeve outer ring to avoid contacting thereof with the sleeve outer ring.

9. The compound bearing apparatus in accordance with claim 1 wherein, at the one side of the apparatus, the inner sealing plate is secured at its inner peripheral portion to the outer peripheral surface of the shaft with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the shaft with leaving a slight axial clearance between the interior surface thereof and the outer end face of the sleeve outer ring to avoid contacting thereof with the sleeve outer ring; and at the other side of the apparatus, the inner sealing plate is secured at its inner peripheral portion to the inner outer peripheral surface of the inner ring with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the inner ring with leaving a slight axial clearance between the interior surface of its outer peripheral portion and the outer end face of the sleeve outer ring to avoid contacting thereof with the sleeve outer ring.

10. A compound bearing apparatus comprising:

a two-stepped shaft including an enlarged diameter shaft portion and a reduced diameter shaft portion, a sleeve outer ring surrounding the stepped shaft, two rows of rotating bodies disposed between the shaft and the sleeve including a first row of the rotating bodies interposed between an outer rolling contact recess formed directly on the outer periphery of the enlarged diameter shaft portion of the two-stepped shaft and a first inner rolling contact recess formed on the inner peripheral surface of the sleeve outer ring and a second row of the rotating bodies interposed between an outer rolling contact recess formed on the outer periphery of an inner ring fitted onto the reduced diameter shaft portion of the two-stepped shaft and a second inner rolling contact recess formed on the inner peripheral surface of the sleeve, and a pair of inner and an outer sealing plates having a through hole at the central portion thereof; wherein at the one side of the apparatus where the first row of the rotating bodies is provided, the sealing plates are mounted between the sleeve outer ring and the enlarged diameter shaft portion with leaving between the plates and the sleeve outer ring or the enlarged diameter shaft portion a slight clearance sufficient to provide a labyrinth seal function, and at the other side of the apparatus where the second row of the rotating bodies is provided, the sealing plates are mounted between the sleeve outer ring and the inner ring with leaving between the plates and the sleeve outer ring or the inner ring a slight clearance sufficient to provide a labyrinth seal function.

11. The compound bearing apparatus in accordance with claim 10 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the enlarged diameter shaft portion of said two-stepped shaft to avoid contacting thereof with the two-stepped shaft, and the outer sealing plate is secured at its inner peripheral portion to the outer peripheral surface of the enlarged diameter shaft portion with leaving a slight clearance between the outer peripheral portion thereof and the inner peripheral surface of the sleeve outer ring to avoid contacting thereof with the sleeve outer ring; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its inner peripheral portion to the outer peripheral surface of the inner ring with leaving a slight clearance between the outer peripheral portion thereof and the inner peripheral surface of the sleeve outer ring to avoid contacting thereof with the sleeve outer ring.

12. The compound bearing apparatus in accordance with claim 10 wherein, at the one side of the apparatus, the inner sealing plate is secured at its inner peripheral portion to the outer peripheral surface of the enlarged diameter shaft portion of said two-stepped shaft with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the enlarged diameter shaft portion of said two-stepped shaft to avoid contacting thereof with the two-stepped shaft; and at the other side of the apparatus, the inner sealing plate is secured at its inner peripheral portion to the inner peripheral surface of the inner ring with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring.

13. The compound bearing apparatus in accordance with claim 10 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the enlarged diameter shaft portion of said two-stepped shaft to avoid contacting thereof with the two-stepped shaft, and the outer sealing plate is secured at its outer peripheral portion to the inner peripheral surface of the sleeve outer ring with leaving a slight clearance between the inner peripheral portion thereof and the outer peripheral surface of the enlarged diameter shaft portion of said two-stepped shaft to avoid contacting thereof with the two-stepped shaft; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring.

14. The compound bearing apparatus in accordance with claim 10 wherein, at the one side of the apparatus, the inner sealing plate is secured at its inner peripheral portion to the outer peripheral surface of the enlarged diameter shaft portion of said two-stepped shaft with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the enlarged diameter shaft portion of said two-stepped shaft with leaving a slight clearance between the outer peripheral portion thereof and the inner peripheral surface of the sleeve outer ring to avoid contacting thereof with the sleeve outer ring; and at the other side of the apparatus, the inner sealing plate is secured at its inner peripheral portion to the outer peripheral surface of the inner ring with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the inner ring with leaving a slight clearance between the outer peripheral portion thereof and the inner peripheral surface of the sleeve outer ring to avoid contacting thereof with the sleeve outer ring.

15. The compound bearing apparatus in accordance with claim 10 wherein, at the one side of the apparatus, the inner sealing plate is secured at its inner peripheral portion to the outer peripheral surface of the enlarged diameter shaft portion of said two-stepped shaft with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of the shaft to avoid contacting thereof with the shaft; and at the other side of the apparatus, the inner sealing plate is secured at its inner peripheral portion to the inner ring with leaving a slight clearance between the outer peripheral portion thereof and the inner peripheral surface of the sleeve outer ring to avoid contacting thereof with the sleeve outer ring, and the outer sealing plate is secured at its outer peripheral portion to the inner peripheral surface of the sleeve outer ring with leaving a slight clearance between the inner peripheral portion thereof and the outer peripheral surface of reduced diameter shaft portion of said two-stepped shaft and with leaving a slight axial clearance between the interior surface thereof and the outer end face of the inner ring to avoid contacting thereof with the inner ring and the shaft.

16. The compound bearing apparatus in accordance with claim 10 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the enlarged diameter shaft portion of said two-stepped shaft to avoid contacting thereof with the two-stepped shaft, and the outer sealing plate is secured at its outer peripheral portion to the inner peripheral surface of the sleeve outer ring leaving a slight clearance between the inner peripheral portion thereof and the outer peripheral surface of the enlarged diameter shaft portion of said two-stepped shaft to avoid contacting thereof with the two-stepped shaft; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its outer peripheral portion to the inner peripheral surface of the sleeve outer ring with leaving a slight clearance between the inner peripheral portion thereof and the outer peripheral surface of the reduced diameter shaft portion of said two-stepped shaft and with leaving a slight axial clearance between the interior surface thereof and the outer end face of the inner ring to avoid contacting thereof with the inner ring and the shaft.

17. The compound bearing apparatus in accordance with claim 10 wherein, at the one side of the apparatus, the inner sealing plate is secured at its outer peripheral portion to the inner peripheral surface of the sleeve outer ring with leaving a slight clearance between the inner peripheral portion thereof and the outer peripheral surface of the enlarged diameter shaft portion of said two-stepped shaft to avoid contacting thereof with the two-stepped shaft, and the outer sealing plate is secured at its inner peripheral portion to the outer peripheral surface of the enlarged diameter shaft portion of said two-stepped shaft with leaving a slight axial clearance between the interior surface thereof and the outer end face of the sleeve outer ring to avoid contacting thereof with the sleeve outer ring; and at the other side of the apparatus, the inner sealing plate is secured at its outer peripheral portion to the inner peripheral surface of the sleeve outer ring with leaving a slight clearance between the inner peripheral portion thereof and the outer peripheral surface of the inner ring to avoid contacting thereof with the inner ring, and the outer sealing plate is secured at its inner peripheral portion to the outer peripheral surface of the inner ring with leaving a slight axial clearance between the outer peripheral portion thereof and the outer end face of the sleeve outer ring to avoid contacting thereof with the sleeve outer ring.

18. The compound bearing apparatus in accordance with claim 10 wherein, at the one side of the apparatus, the inner sealing plate is secured at its inner peripheral portion to the outer peripheral surface of the enlarged diameter shaft portion of said two-stepped shaft with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the enlarged diameter shaft portion of said two-stepped shaft with leaving a slight axial clearance between the interior surface thereof and the outer end face of the sleeve outer ring to avoid contacting thereof with the sleeve outer ring; and at the other side of the apparatus, the inner sealing plate is secured at its inner peripheral portion to the inner outer peripheral surface of the inner ring with leaving a slight clearance between the outer peripheral portion thereof and the inner peripheral surface of the sleeve outer ring to avoid contacting thereof with the sleeve outer ring, and the outer sealing plate is secured at its inner peripheral portion to the outer peripheral surface of the inner ring with leaving a slight axial clearance between the interior surface of its outer peripheral portion and the outer end face of the sleeve outer ring to avoid contacting thereof with the sleeve outer ring.

* * * * *